(12) United States Patent
Martinez et al.

(10) Patent No.: US 10,124,742 B2
(45) Date of Patent: Nov. 13, 2018

(54) FASTENER APPARATUS, AND METHODS OF USE AND MANUFACTURE THEREOF

(71) Applicant: Honda Patents & Technologies North America, LLC., Raymond, OH (US)

(72) Inventors: Edgar A. Martinez, Dublin, OH (US); Nicholas P. Ziraldo, Powell, OH (US)

(73) Assignee: HONDA PATENTS & TECHNOLOGIES NORTH AMERICA, LLC., Raymond, OH (US)

( * ) Notice: Subject to any disclaimer, the term of this patent is extended or adjusted under 35 U.S.C. 154(b) by 0 days.

(21) Appl. No.: 15/457,232

(22) Filed: Mar. 13, 2017

(65) Prior Publication Data

US 2018/0257583 A1    Sep. 13, 2018

(51) Int. Cl.
| | | |
|---|---|---|
| *B60R 13/01* | (2006.01) | |
| *F16B 21/07* | (2006.01) | |
| *F16B 5/06* | (2006.01) | |

(52) U.S. Cl.
CPC .......... *B60R 13/013* (2013.01); *F16B 5/0642* (2013.01); *F16B 21/073* (2013.01)

(58) Field of Classification Search
CPC .......... H01R 13/74; Y02E 10/47; B60K 1/04; B60R 13/0206; B60R 16/04; B60R 13/01; B60R 2013/018; Y10T 29/49947; B60P 7/0807; B65D 2590/046
USPC ............... 296/39.1, 1.08, 35.1, 39.2; 24/297
See application file for complete search history.

(56) References Cited

U.S. PATENT DOCUMENTS

| | | | | | |
|---|---|---|---|---|---|
| 1,896,873 | A | * | 2/1933 | Upham | A44B 17/0052 16/8 |
| 2,015,049 | A | * | 9/1935 | Carr | A44B 17/0052 24/681 |
| 2,042,866 | A | * | 6/1936 | Simons | A44B 17/0076 24/689 |
| 2,131,347 | A | * | 9/1938 | Fenton | A44B 17/0052 2/240 |
| 2,668,340 | A | * | 2/1954 | Jones | A44B 17/0052 24/681 |
| 2,683,908 | A | * | 7/1954 | Carpinella | A44B 17/0082 2/123 |
| 2,724,884 | A | * | 11/1955 | Jones | A44B 17/0029 24/693 |
| 2,745,160 | A | * | 5/1956 | Jones | A44B 17/0035 156/66 |
| 2,799,910 | A | * | 7/1957 | Weber | A44B 17/0082 24/681 |

(Continued)

FOREIGN PATENT DOCUMENTS

| | | |
|---|---|---|
| JP | 4837546 B2 | 12/2011 |
| JP | 5852860 B2 | 2/2016 |
| WO | 2011033482 A1 | 3/2011 |

*Primary Examiner* — Kiran B Patel
(74) *Attorney, Agent, or Firm* — Kenealy Vaidya LLP

(57) ABSTRACT

Some embodiments are directed to a fastener assembly for attaching a cargo liner to a male fastener of a vehicle. The fastener assembly can include a cap defining a substantially cylindrical center portion configured to receive the male fastener therein, and a plurality of tabs each spaced from the cylindrical center portion. The fastener assembly can also include a ring-shaped retainer defining an opening with a plurality of protrusions that each define a ledge configured to receive a corresponding one of the tabs.

20 Claims, 19 Drawing Sheets

(56) References Cited

U.S. PATENT DOCUMENTS

| | | | | |
|---|---|---|---|---|
| 3,010,169 A * | 11/1961 | Carpinella | A44B 17/00 | 24/107 |
| 3,091,795 A * | 6/1963 | Budwig | F16L 5/027 | 16/2.1 |
| 3,407,454 A * | 10/1968 | Myatt | B64D 29/06 | 411/549 |
| 3,579,942 A * | 5/1971 | Cole | F16B 5/01 | 411/113 |
| 3,613,181 A * | 10/1971 | Taylor | A44B 17/0029 | 24/662 |
| 3,716,980 A | 2/1973 | Rehn et al. | | |
| 3,954,344 A * | 5/1976 | Nakama | F16B 21/02 | 403/14 |
| 4,122,583 A * | 10/1978 | Grittner | B60R 13/0206 | 24/297 |
| 4,392,279 A * | 7/1983 | Schwager | A63H 3/38 | 24/109 |
| 4,406,033 A * | 9/1983 | Chisholm | A47G 27/0418 | 16/4 |
| 4,470,737 A * | 9/1984 | Wollar | F16B 21/086 | 24/453 |
| 4,561,146 A * | 12/1985 | Schaty | A44B 17/0029 | 16/4 |
| 4,562,624 A * | 1/1986 | Kanzaka | A44B 17/0029 | 24/621 |
| 4,765,036 A * | 8/1988 | Iguchi | B60R 13/04 | 24/289 |
| 4,878,792 A * | 11/1989 | Frano | B60N 3/046 | 24/615 |
| 4,981,405 A * | 1/1991 | Kato | F16B 21/02 | 24/297 |
| 5,170,985 A * | 12/1992 | Killworth | B60G 99/004 | 248/634 |
| 5,195,857 A * | 3/1993 | Hiramoto | F16B 21/086 | 411/173 |
| 5,362,187 A * | 11/1994 | Scalise | F16B 21/04 | 411/350 |
| 5,368,427 A * | 11/1994 | Pfaffinger | F16B 21/04 | 24/580.1 |
| 5,400,461 A * | 3/1995 | Malish | A47L 11/162 | 15/230 |
| 5,511,919 A * | 4/1996 | Scalise | F16B 21/04 | 411/182 |
| 5,566,430 A * | 10/1996 | Cheng | A44B 1/08 | 24/456 |
| 5,940,940 A * | 8/1999 | Tanikoshi | A44B 17/0082 | 24/108 |
| 6,357,090 B1 * | 3/2002 | Murai | A44B 99/005 | 24/590.1 |
| 6,568,893 B2 * | 5/2003 | LeVey | F16B 5/0642 | 411/349 |
| 6,609,338 B2 * | 8/2003 | Hightower | E06B 3/5481 | 292/241 |
| 6,612,795 B2 * | 9/2003 | Kirchen | F16B 21/02 | 24/297 |
| 7,131,806 B2 * | 11/2006 | Hansen | B60R 13/0206 | 411/41 |
| 7,581,913 B2 * | 9/2009 | Ordonio, Jr. | F16B 37/14 | 411/369 |
| 7,748,089 B2 * | 7/2010 | Jalbert | F16B 5/0657 | 24/297 |
| 8,572,822 B2 * | 11/2013 | Hasegawa | A44B 17/0023 | 24/108 |
| 8,740,530 B2 * | 6/2014 | Cosenza | F16B 5/0208 | 411/353 |
| 8,991,006 B2 * | 3/2015 | Masanek, Jr. | B60N 3/044 | 16/21 |
| 9,179,743 B2 * | 11/2015 | Momose | A44B 17/0029 | |
| 9,328,758 B2 * | 5/2016 | Schermer | D01H 4/32 | |
| 9,340,136 B2 | 5/2016 | Masanek, Jr. | | |
| 9,482,491 B1 * | 11/2016 | Luster | F16B 5/0642 | |
| 9,517,712 B1 * | 12/2016 | Masanek, Jr. | B60N 3/044 | |
| 9,669,745 B2 * | 6/2017 | Machida | B60N 3/046 | |
| 9,845,036 B2 * | 12/2017 | Masanek, Jr. | B60N 3/044 | |
| 2001/0004784 A1 * | 6/2001 | Calabrese | B60N 3/046 | 16/8 |
| 2005/0220569 A1 | 10/2005 | Dryer | | |
| 2007/0098523 A1 * | 5/2007 | Klein | B60R 13/0206 | 411/508 |
| 2008/0166206 A1 * | 7/2008 | Edland | F16B 21/086 | 411/510 |
| 2008/0201920 A1 * | 8/2008 | Jatzke | B60R 11/00 | 24/458 |
| 2009/0235485 A1 * | 9/2009 | Connor, Jr. | B60N 3/046 | 16/4 |
| 2010/0122429 A1 * | 5/2010 | Gonzalez | B60N 3/042 | 16/4 |
| 2011/0110713 A1 * | 5/2011 | Chou | F04D 25/0613 | 403/291 |
| 2013/0313854 A1 * | 11/2013 | Johnson | B60N 3/046 | 296/97.23 |
| 2016/0230796 A1 * | 8/2016 | Chiang | G03B 17/14 | |

\* cited by examiner

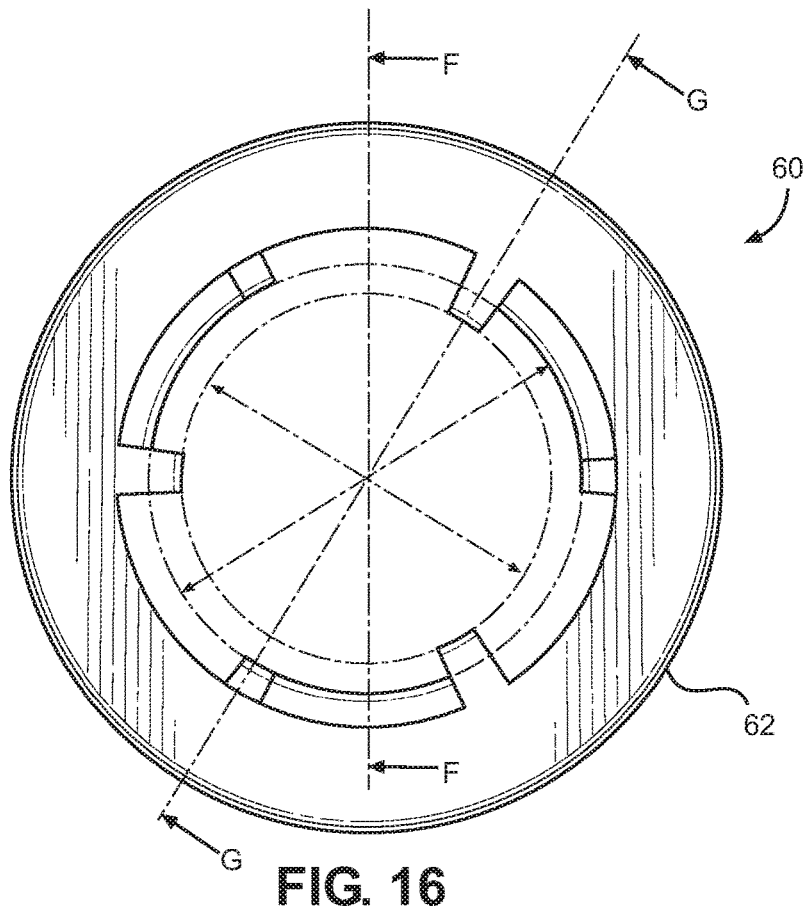
FIG. 16
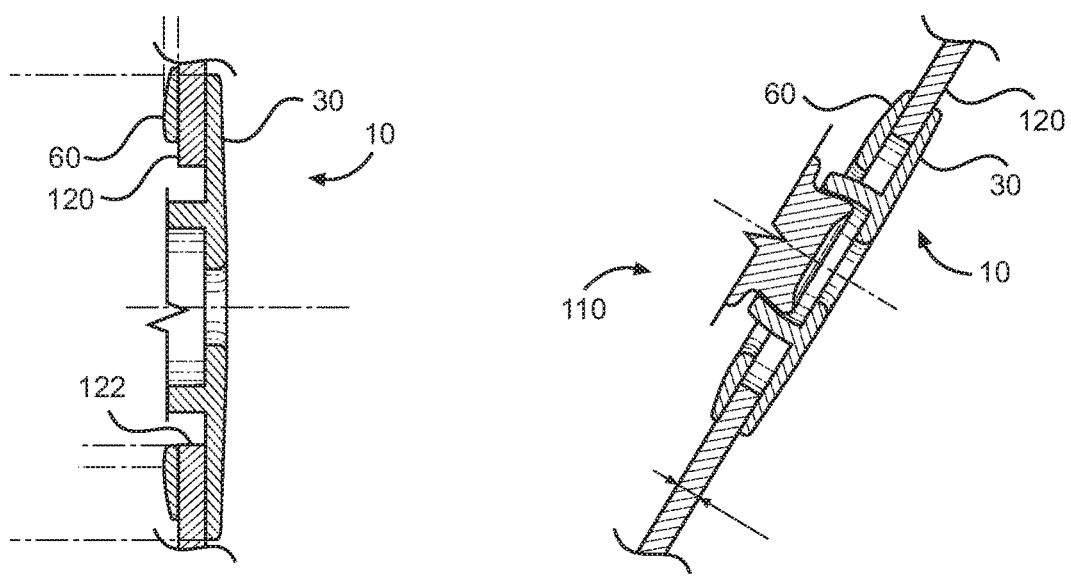
FIG. 17   FIG. 18

FASTENER APPARATUS, AND METHODS OF USE AND MANUFACTURE THEREOF

BACKGROUND

The disclosed subject matter relates to fastener apparatus, and methods of use and manufacture thereof. More particularly, the disclosed subject matter relates to apparatus and methods that removably secure a cargo liner within a vehicle.

Vehicle cargo liners protect a cargo area of a vehicle from wear. Fasteners are used to removably secure the cargo liners to the cargo area. Configuration of the fasteners can affect ease of factory installation of the cargo liner, ease of replacement by either users or dealers, and ease of removal/reinstallation by users. Configuration of the fasteners can also affect integrity of attachment between the cargo liners and the cargo area during cycle of usage such as operation of the vehicle.

SUMMARY

According to one aspect, a fastener assembly can be provided for attaching a cargo liner to a male fastener of a vehicle. The fastener assembly can include a cap defining a substantially cylindrical center portion configured to receive the male fastener therein, and a plurality of tabs each spaced from the cylindrical center portion. The fastener assembly can also include a ring-shaped retainer defining an opening with a plurality of protrusions that each define a ledge configured to receive a corresponding one of the tabs.

According to another aspect, a cargo liner assembly can be provided for attachment to a cargo area of a vehicle. The cargo liner assembly can include a liner body having at least one aperture extending from a first side of the liner body through to a second side of the liner body. The cargo liner assembly can also include a cap defining a substantially cylindrical center portion and a plurality of tabs each spaced from the cylindrical center portion, the cap being configured for engagement with the at least one aperture on the first side of the liner body. The cargo liner assembly can further include a ring-shaped retainer defining an opening with a plurality of protrusions that each define a ledge configured to receive a corresponding one of the tabs, the ring-shaped retainer being configured for engagement with the at least one aperture on the second side of the liner body.

According to yet another aspect, a fastener assembly can be provided for attaching a cargo liner to a vehicle. The fastener assembly can include a female fastener. The female fastener can have a cap defining a substantially cylindrical center portion and a plurality of tabs each spaced from the center portion. The female fastener can also have a ring-shaped retainer defining an opening with a plurality of protrusions that each define a ledge configured to receive a corresponding one of the tabs. The fastener assembly can also include a male fastener defining a cylindrical center portion configured to be inserted into the cylindrical center portion of the cap.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 16 is a plan view of a top of the retainer with cross-sectional lines F-F and G-G.

FIG. 17 is a cross-section view F-F of the retainer of FIG. 16 with the cap.

FIG. 18 is a cross-section view G-G of the retainer of FIG. 16 with the cap and the male fastener.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Fastener Assembly Overview

Figure 1:
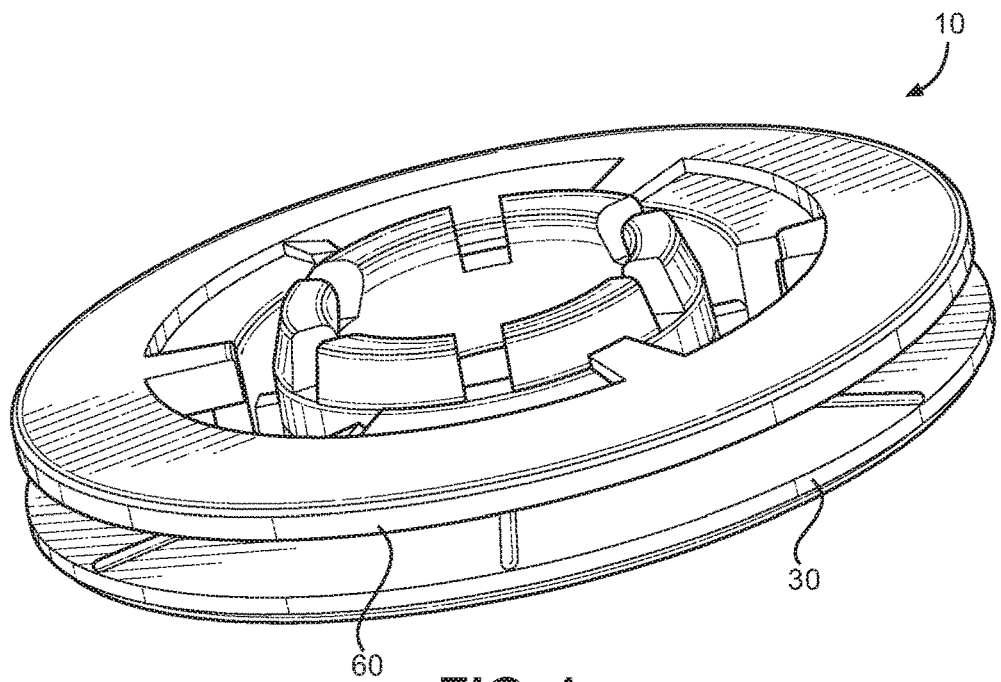
FIG. 1 is a perspective view of a fastener assembly 10 for a cargo liner of a vehicle in accordance with the disclosed subject matter.

FIG. 1 illustrates an embodiment of fastener assembly 10 for a cargo liner of a vehicle in accordance with the disclosed subject matter. The fastener assembly 10 shown in FIG. 1 has two parts (a cap 30 and a retainer 60) that fit together to form a female fastener for engagement with a male fastener.

II. Cap Part

Figure 2:
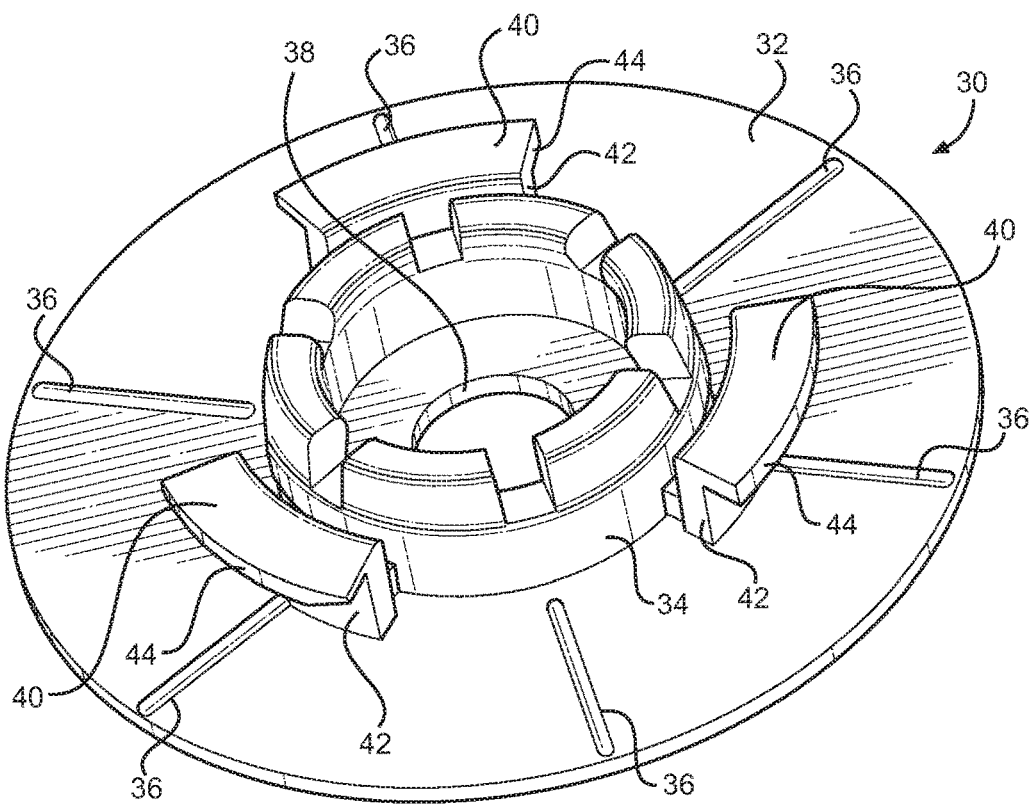
FIG. 2 is a perspective view of an upper portion of a cap of the fastener assembly.

FIG. 2 is a perspective view of an upper portion of the cap 30 of the fastener assembly 10. The cap 30 can have a circular disc-shaped body 32 with a hole 38, and a cylindrically shaped central portion 34 protruding from one side of the body 32 around the hole 38. The central portion 34 can be configured to receive a male fastener therein for securing the cap 30 and the retainer 60 with a cargo liner. The body 32 can have ribs 36 extending axially from the central portion 34 to enhance structural rigidity. The present embodiment of the body 32 includes six of the ribs 36, however other embodiments may have fewer or greater number of the ribs 36, or be formed entirely without them.

The cap 30 can have tabs 40 spaced apart from the central portion 34 and protruding from the one side of the body 32. The tabs 40 can be disposed concentrically around the central portion 34 so that the tabs 40 are arcuate, and can each include a base 42 and a projection 44. The base and the projection 44 can be perpendicularly joined such that the tab 40 is L-shaped. The present embodiment of the cap 30 can include three of the tabs 40, however other embodiments may include fewer or greater number of the tabs 40.

Figure 3:
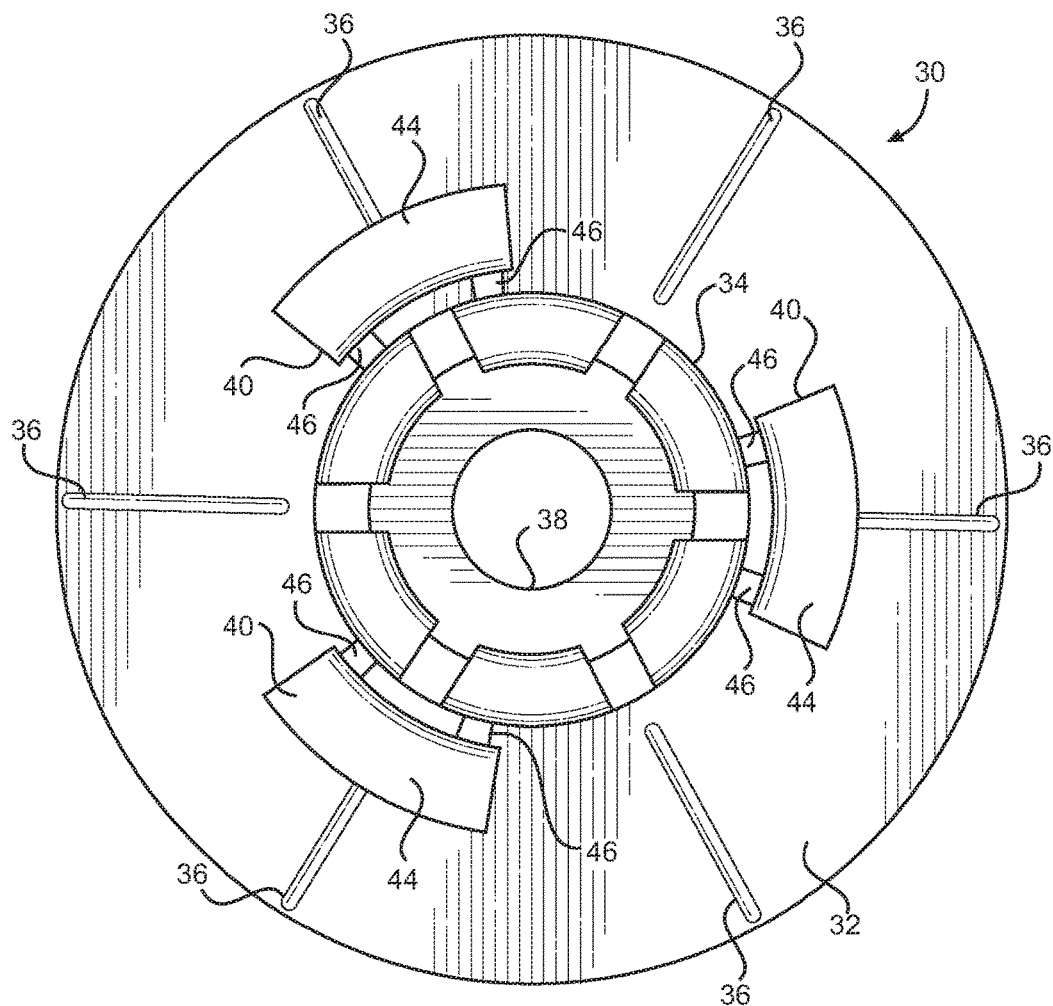
FIG. 3 is a plan view of a top of the cap.

FIG. 3 is a plan view of a top of the cap. As shown in FIG. 3, the tabs 40 can each include a pair of supports 46 by which the tabs 40 are spaced from the central portion 34. The supports 46 can connect the base 42 to the central portion 34.

Figure 4:
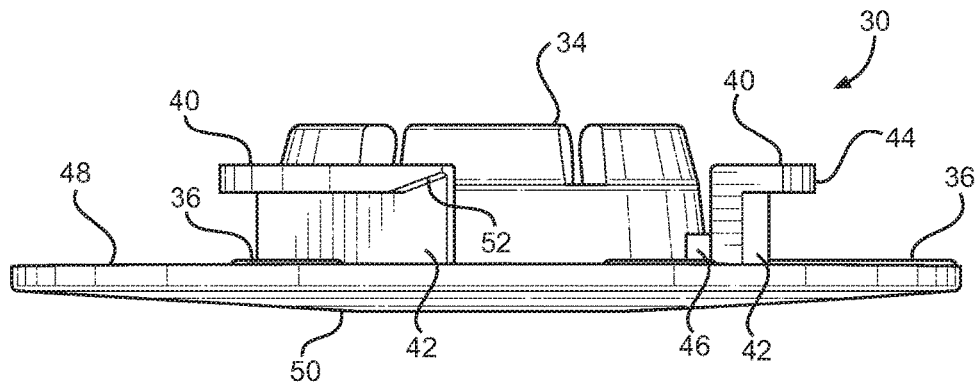
FIG. 4 is a side view of the cap.

FIG. 4 is a side view of the cap 30. As shown in FIG. 4, the central portion 34 and the tabs 40 can protrude from an upper side 48 of the body 32. In the present embodiment, the central portion 34 can protrude a greater distance than the tabs 40, however other embodiments may be configured such that the tabs 40 protrude a greater distance than the central portion 34, or both protrude an equal distance. The body 32 can additionally include a lower side 50 having an approximately convex surface opposite the upper side 48.

The projection 44 of each of the tabs 40 can include a contact surface 52 configured for engagement with a protrusion of the retainer 60, as will be described below. The surface of the projection 44 can be tapered to facilitate this engagement.

III. Retainer Part

Figure 5:
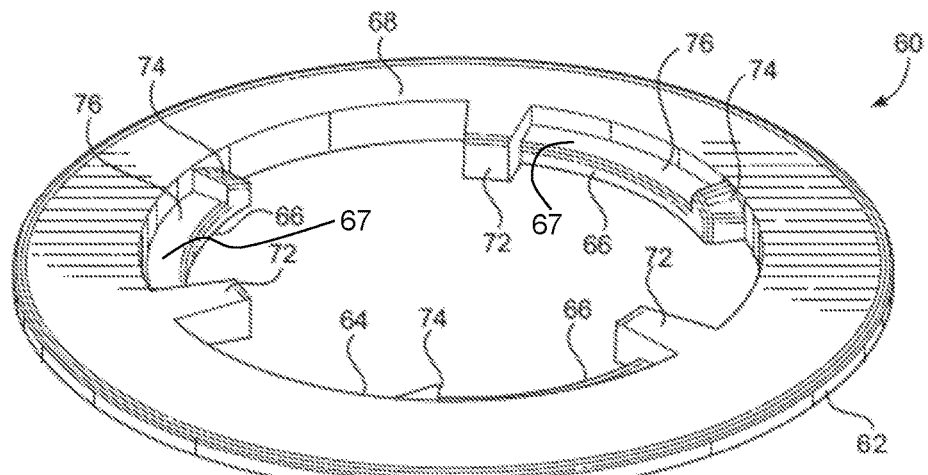
FIG. 5 is a perspective view of an upper portion of a retainer of the fastener assembly.

FIG. 5 is a perspective view of an upper portion of the retainer 60 of the fastener assembly 10. The retainer 60 can have a ring-shaped body 62 defining an opening 64. The retainer 60 can have protrusions 66 extending from an inner perimeter of the body 62 into the opening 64. The protrusions 66 can form ledges 67 onto which the tabs 40 can be slid to secure the cap 30 and the retainer 60 together, as will be described below. The protrusions 66 can be spaced from the adjacent protrusions 66 around the opening 64 by slots. The slots between the protrusions 66 are configured to facilitate passage of the tabs 40 of the cap 30 therethrough. Particularly, the protrusions 66 can be spaced from the adjacent protrusions 66 around the opening 64 by a distance of at least a length of each of the tabs 40, as will be described below.

Each of the protrusions 66 can include a stop 72 at one end. The stop 72 can include a surface configured to engage the corresponding tab 40 and thereby impede movement of the tab 40. Each of the protrusions 66 can also include a projection 74 having a tapered surface at the other end of the protrusion 66. The projection 74 can be wedge-shaped to form a locking projection to also engage the corresponding tab 40 and thereby facilitate translational movement of the tab 40 along the corresponding protrusion 66. Each of the protrusions 66 can further include a recessed portion 76 adjacent the projection 74 and extending to the stop 72. The recessed portion 76 can have a surface configured to engage a corresponding surface of the respective tab 40 that is recessed from the tapered surface of the projection 74.

Figure 6:
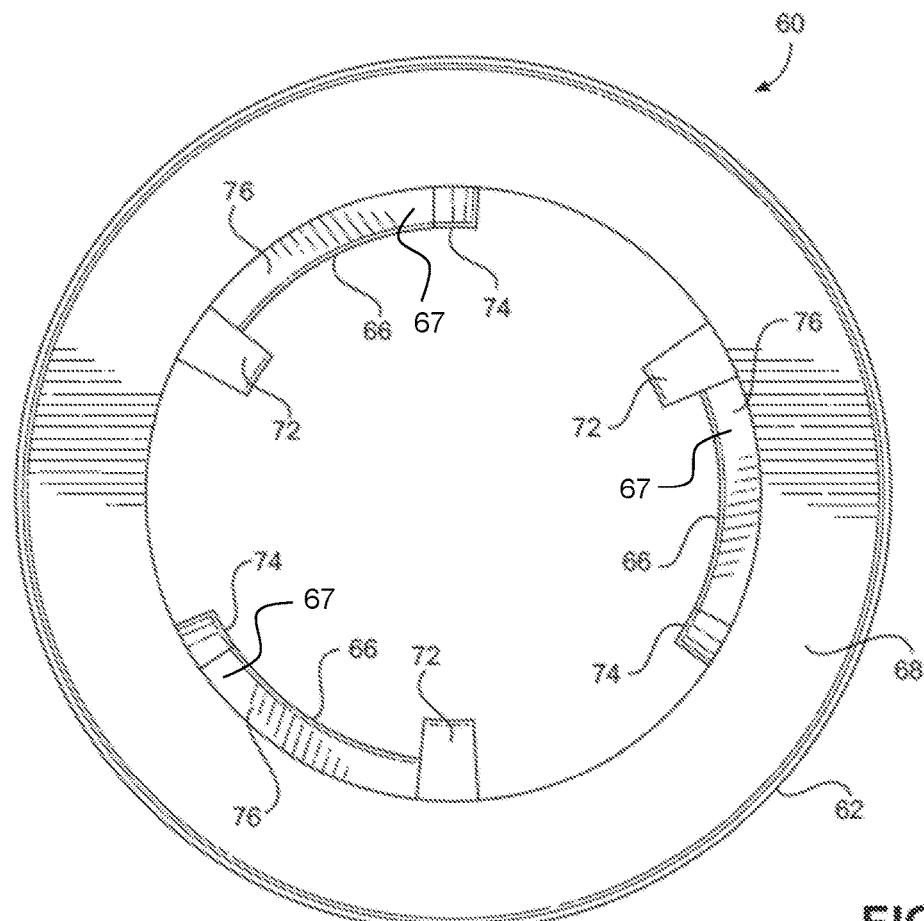
FIG. 6 is a plan view of a top of the retainer.

FIG. 6 is a plan view of a top of the retainer 60. As shown in FIG. 6, the stops 72 of the protrusions 66 can extend from the inner perimeter of the body 62 farther into the opening 64 than the projections 74 and the recessed portions 76.

Figure 7:
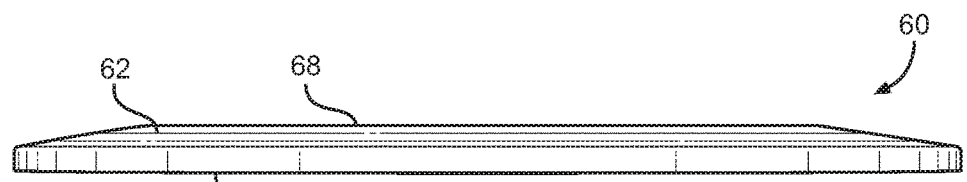
FIG. 7 is a side view of the retainer.

FIG. 7 is a side view of the retainer 60. As shown in FIG. 7, the body 62 of the retainer 60 can have an approximately convex upper side 68 and a planar lower side 70. The planar lower side 70 is configured to face the upper side 48 of the body 32 when retainer 60 and the cap 30 are secured together, as will be described below.

IV. Cap and Retainer Dimensions and Fitment

Figure 8:
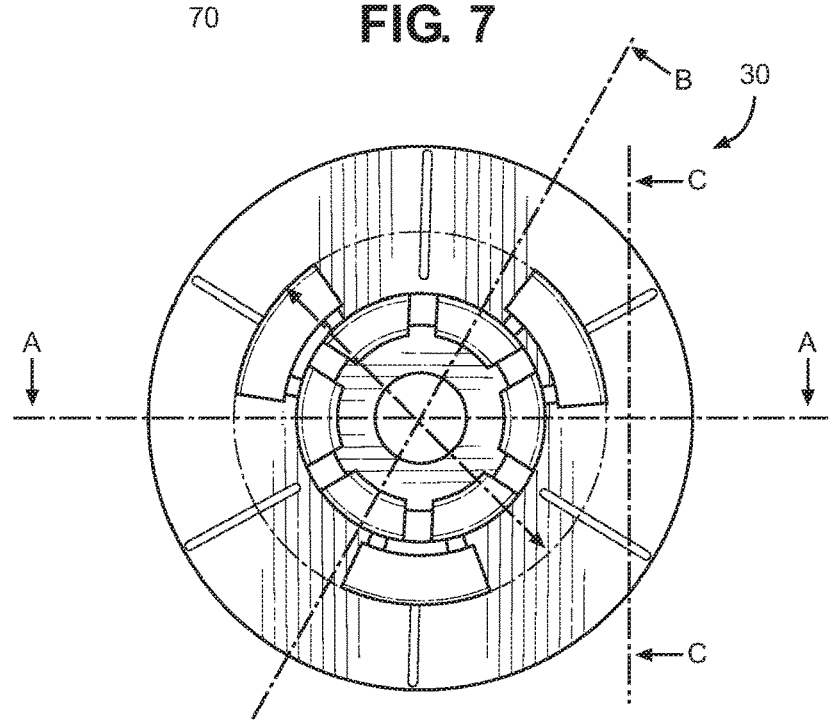
FIG. 8 is plan view of the top of the cap with cross-sectional lines A-A, B-B and C-C shown.

FIG. 8 is plan view of the top of the cap 30 with cross-sectional lines A-A, B-B and C-C shown.

Figure 9:
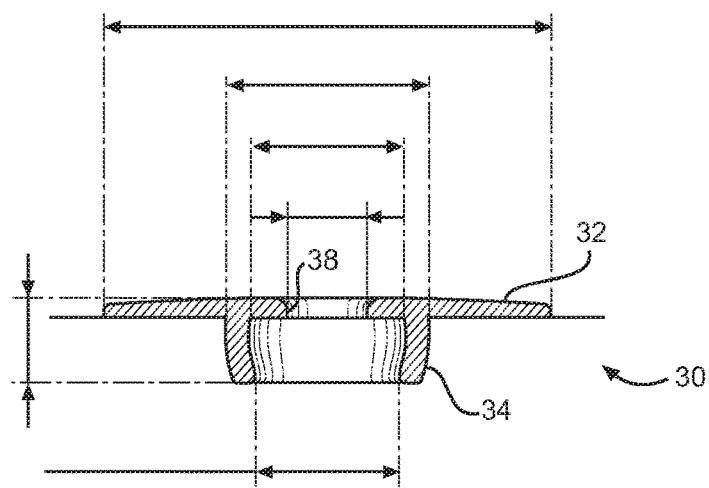
FIG. 9 is a cross-section view A-A of the cap of FIG. 8.

FIG. 9 is a cross-section view A-A of the cap 30 of FIG. 8. As shown in FIG. 9, an inner diameter of the central portion 34 can be greater than a diameter of the hole 38 formed in the body 32. The inner diameter of the central portion 34 can also narrow progressively the farther the central portion 34 extends from the body 34. This narrowing of the inner diameter of the central portion 34 facilitates engagement and retention of the male fastener therein, as will be described below.

Figure 10:
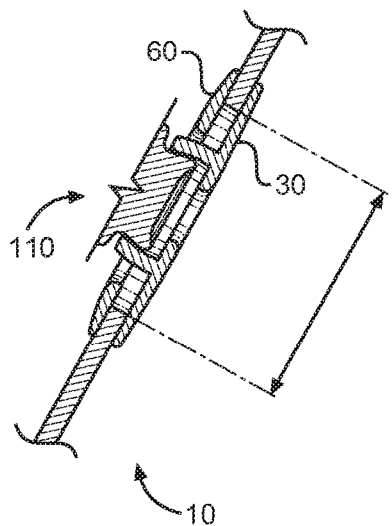
FIG. 10 is a cross-section view B-B of the cap of FIG. 8, with the cap shown in engagement with both the retainer and the male fastener.

FIG. 10 is a cross-section view B-B of the cap 30 of FIG. 8, with the cap 30 shown in engagement with both the retainer 60 and the male fastener 110. As shown in FIG. 10, a protruding end of the male fastener 110 can be inserted into the interior of the central portion 34, and retained therein by virtue of the narrowing inner diameter and complementary increasing outer diameter of the male fastener 110. The Male fastener 110 can be inserted following engagement of the cap 30 with the retainer 60.

Figure 11:
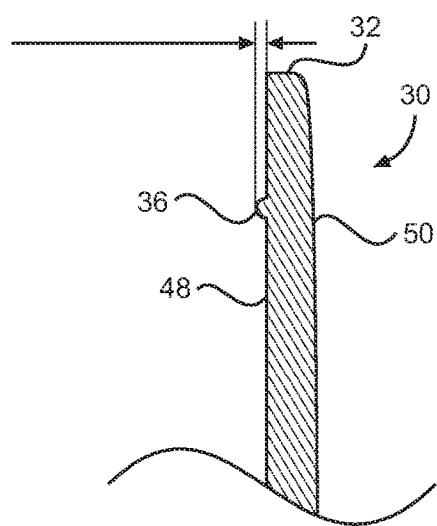
FIG. 11 is a cross-section view C-C of the cap of FIG. 8.

FIG. 11 is a cross-section view C-C of the cap 30 of FIG. 8. As shown in FIG. 11, the rib 36 can be raised to extend away from the upper side 38 of the body 32.

Figure 12:
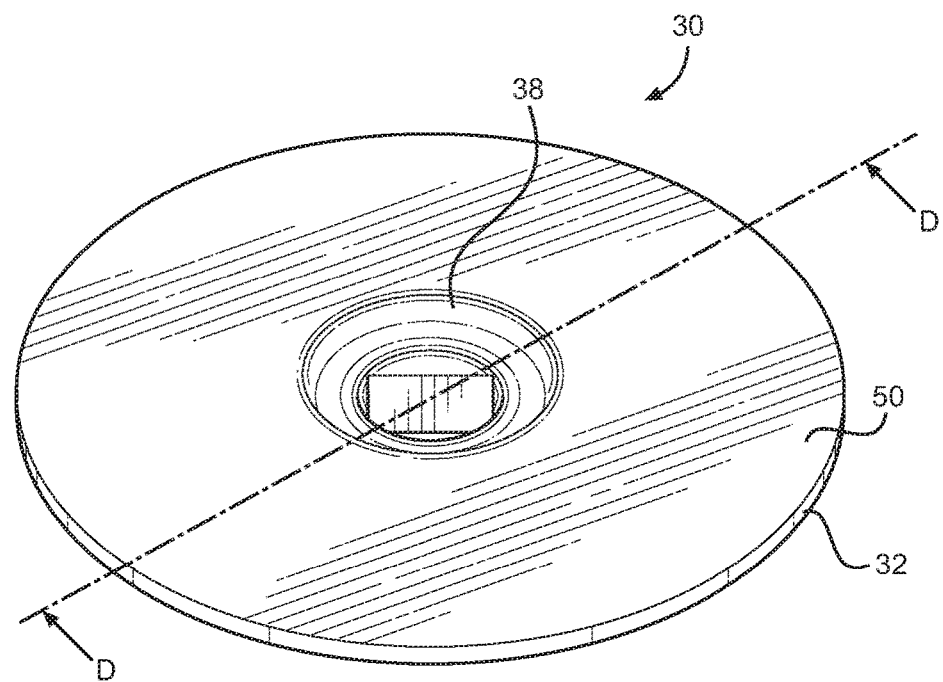
FIG. 12 is a perspective view of a lower portion of the cap.

FIG. 12 is a perspective view of a lower portion of the cap 30. As shown in FIG. 12, the lower side 50 can be planar with the hole 38 formed proximate the central portion 34.

Figure 13:
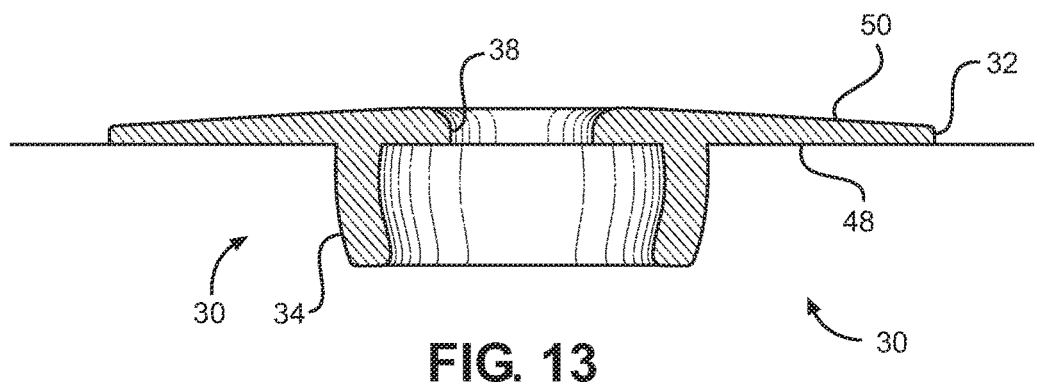
FIG. 13 is a cross-section view D-D of the cap of FIG. 12.

FIG. 13 is a cross-section view D-D of the cap 30 of FIG. 12. As shown in FIG. 12, the hole 38 in the body 32 can be tapered outward from the upper side 48, while the central portion 34 can be tapered inward.

Figure 14:
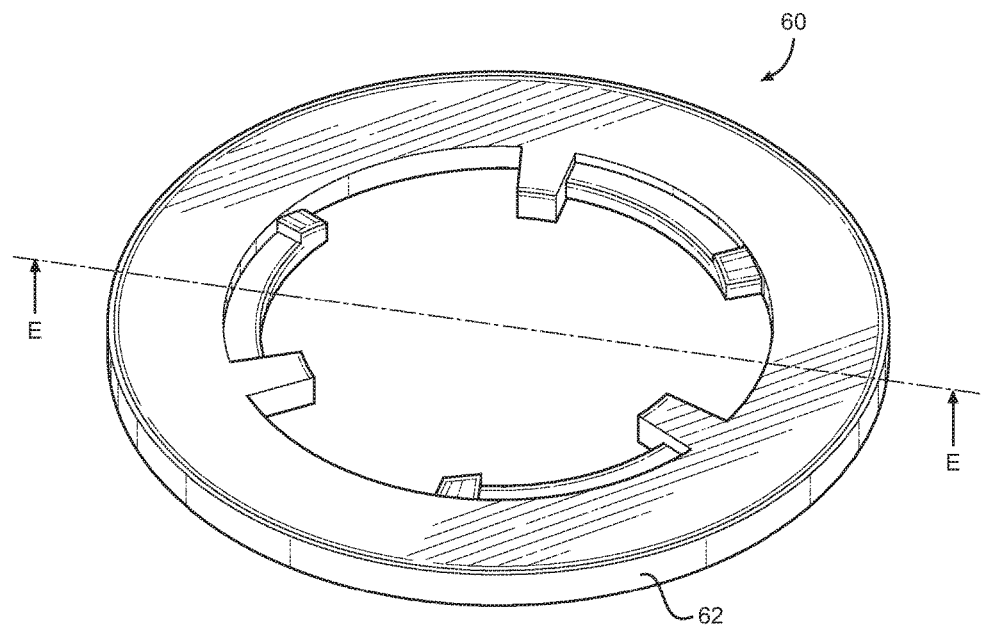
FIG. 14 is a perspective view of the upper portion of the retainer.

FIG. 14 is a perspective view of the upper portion of the retainer 60 with cross-sectional line E-E.

Figure 15:
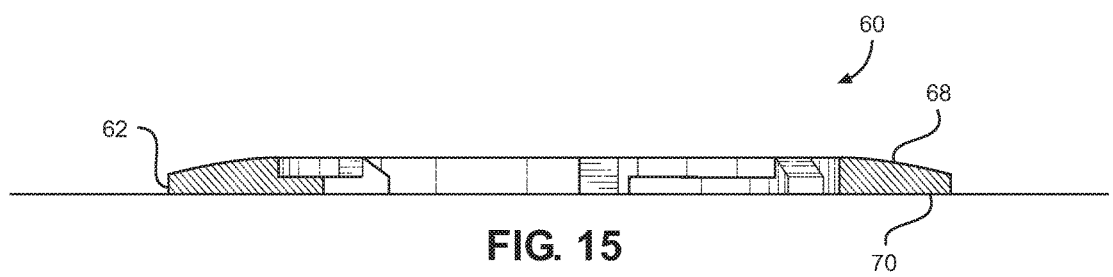
FIG. 15 is a cross-section view E-E of the retainer of FIG. 14.

FIG. 15 is a cross-section view E-E of the retainer 60 of FIG. 14. As shown in FIG. 15, the body 62 can be tapered at an outer perimeter such that the upper side 68 is approximately convex.

FIG. 16 is a plan view of a top of the retainer 60 with cross-sectional lines F-F and G-G.

FIG. 17 is a cross-section view F-F of the retainer 60 of FIG. 16 with the cap 30. As shown in FIG. 16, the retainer 60 and the cap 30 can be engaged to secure the cargo liner 120 therebetween. Particularly, the cargo liner 120 can be secured between the upper side 48 of the body 32 of the cap 30 and the lower side 70 of the body 62 of the retainer 60. In clamping the liner 120 in place, the central portion 34 of the cap 30 can be inserted through a hole 122 in the liner 120 and the upper side 48 brought into contact with an adjacent side of the liner 120. The lower side 70 of the retainer 60 can then be brought into contact with an opposing adjacent side of the liner 120, and the tabs 40 can engage the protrusions 66 to lock the cap 30 and the retainer 60 together, thereby securing the liner 120 therebetween.

FIG. 18 is a cross-section view G-G of the retainer 60 of FIG. 16 with the cap 30 and the male fastener 110. As shown in FIG. 18, once the cap 30 and the retainer 60 have secured the liner 120 therebetween, the male fastener 110 can be inserted into the central portion 34 of the cap 30 for securing the fastener assembly 10 and the liner 120.

V. Operation

The present embodiment of the fastener assembly 10 is configured to sandwich a portion of the liner 120 at the hole 122. The cap 30 engages the hole 122 from one side of the liner 120 and the retainer 60 engages the hole 122 from the opposing side of the liner 120. Because both the cap 30 and the retainer 60 have greater diameters than that of the hole 122, the cap 30 and the retainer 60 cannot pass through the hole 122. Instead, only the central portion 34 and the tabs 40 of the cap 30 passes through the hole 122 from the one side to the opposing side of the liner 120. The tabs 40 can thereby pass through the slots defined between the protrusions 66 of the retainer 60. With the tabs 40 having passed through the slots, the liner 120 is positioned between the upper side 48 of the body 32 of the cap 30 and the lower side 70 of the body 62 of the retainer 60.

With the liner 120 held between the cap 30 and the retainer 60, the cap 30 and/or the retainer 60 are twisted with respect to one another in a predetermined direction. In the present embodiment, this direction is clockwise, however other embodiments may require counterclockwise twisting. This twisting, or rotating movement, moves the tabs 40 into contact with the protrusions 66. Particularly, the projections 44 are brought into contact with the respective projections 74 of the protrusions 66. The tapered surface of the projections 74 facilitates overlapping of the projections 44 onto and past the projections 74. Once the tabs 40 have been sufficiently twisted with respect to the protrusions 66, the projections 44 move past the projections 74 to the recessed portions 76 of the protrusions 66. The recessed portions 76 serve to form ledges on which the projections 44 are supported. Any further rotation of the cap 30 and the retainer 60 is impeded by the stops 72 disposed adjacent the recessed portions 76, ensuring the cap 30 and the retainer 60 maintain proper engagement. Similarly, the projections 74 also include stopping walls opposing the stops 72 to prevent the projections 44 from rotating out of placement within the recessed portions 76.

In this manner, the cap 30 and the retainer 60 are locked together via the tabs 40 and the protrusions 66, and the liner 120 is thereby held between them. Due to the clamping nature of the engagement between the cap 30 and the retainer 60 described above, the liner 120 can be compressed therebetween. This compression of the liner 120 causes the liner 120 to exert a force outward against the cap 30 and the retainer 60 during engagement. The outward force exerted by the liner 120 against the cap 30 and the retainer 60 serves to press the cap 30 and the retainer 60 away from one another, which further secures the projections 44 respective positions in the recessed portions 76. As long as the projections 44 are disposed within the recessed portions 76, the tabs 40 cannot be rotated away from the protrusions 66 back to the slots, and thus malfunction in the form of disengagement can be impeded. The liner 120 can then be secured to surfaces of the cargo area for protection, as will be described below.

Disengaging the cap 30 from the retainer 60 can be achieved by pressing the cap 30 and the retainer 60 closer together so as to move the projections 44 out of the recessed portions 76. Once the projections 44 of the tabs 44 have been moved out of the recessed portions 76 of the protrusions 66, the cap 30 and the retainer 60 can be twisted back the opposite direction, which in the present embodiment is the counterclockwise direction, to rotate the tabs 40 away from the protrusions 66 and towards the slots therebetween. With the tabs 40 having been rotated back in alignment with the slots, the cap 30 and the retainer can be pulled apart and the tabs 40 can pass through the slots and the hole 122 unobstructed. The cap 30 and the retainer 60 can thereby be easily removed from the hole 122 and the liner 120 to facilitate maintenance/repair or replacement of the cap 30 or the retainer 60, or the liner 120.

Figure 19:
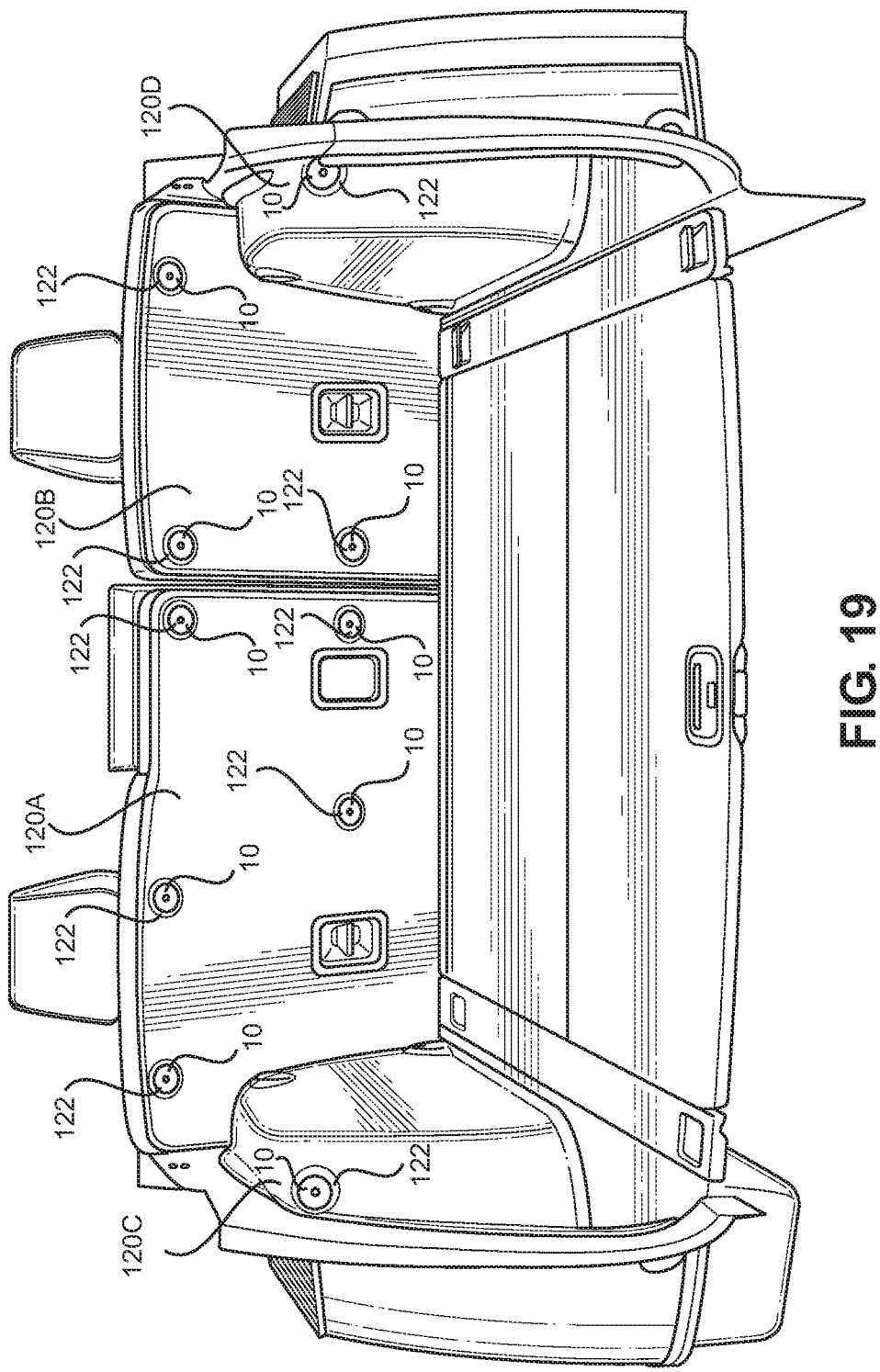
FIG. 19 is a perspective view of a rear of the vehicle cargo area.

FIG. 19 is a perspective view of a rear of the vehicle cargo area. The cargo area can be configured as a trunk or boot area of the vehicle arranged rearward of passenger seating. The cargo area can include surfaces to be covered by the cargo liners 120A, 120B, 120C and 120D for protection. The cargo liners 120A and 120B can be approximately planar to cover approximately planar surfaces of the cargo area, while cargo liners 120C and 120D may be contoured to follow irregular surfaces of the cargo area. Each of the cargo liners 120A, 120B, 120C and 120D can include holes 122 extending from one side to the opposing side thereof. The holes 122 are configured to communicate with the fastener assemblies 10 attached therein for securing the cargo liners 120A, 120B, 120C and 120D to the respective surfaces of the cargo area. The cargo liners 120A, 120B, 120C and 120D can each include any number of the holes 122 for attaching the fastener assemblies 10, such as one, two, three, four, etc. The overall shape and size, as well as how many surfaces are contacted by each of the cargo liners 120A, 120B, 120C and 120D can dictate an appropriate number of the holes 122 and corresponding fastener assemblies 10.

Figure 20:
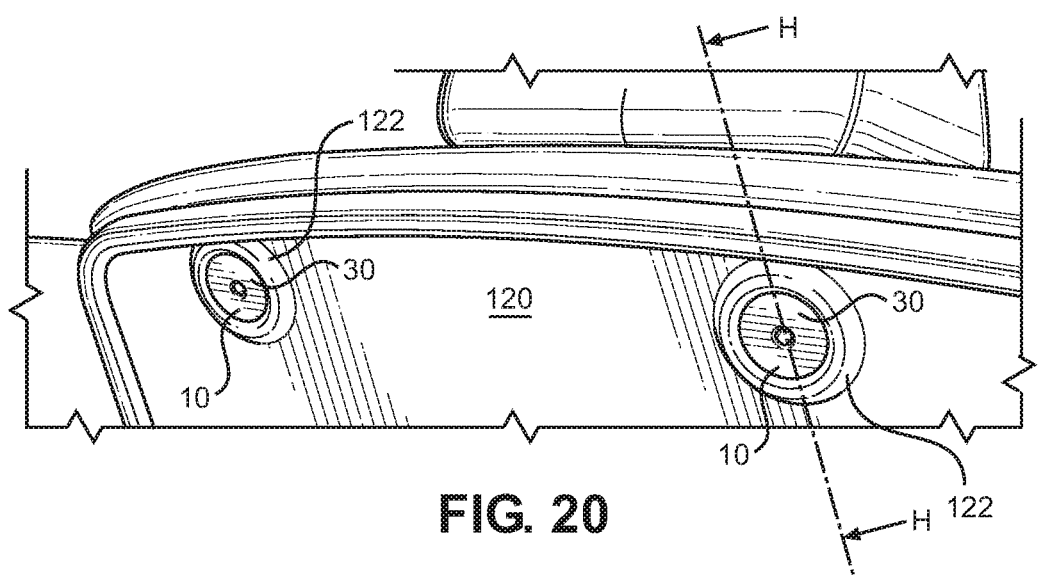
FIG. 20 is an enlarged perspective view of a portion of the liner installed in the cargo area of the vehicle with a pair of the fastener assemblies.

FIG. 20 is an enlarged perspective view of a portion of the liner 120 installed in the cargo area of the vehicle with a pair of the fastener assemblies 10. As shown in FIG. 20, the holes 122 in the liner 120 can be formed near perimeter edges, such as a top liner edge 124. The holes 122 can also be surrounded by rings raised from a surface of the liner 120 to enhance positioning and retention of the fastener assemblies 10 within the holes 122. Particularly, the caps 30 of the respective fastener assemblies 10 are exposed to the interior of the cargo area while the retainers 60 are hidden and face the surfaces contacted by the liner 120. The caps 30, specifically the lower sides 50, can be formed to have an attractive appearance with regards to fit and finish for users such as vehicle passengers because the caps 30 remain visible in the cargo area of the vehicle once the liner 120 has been installed.

Figure 21:
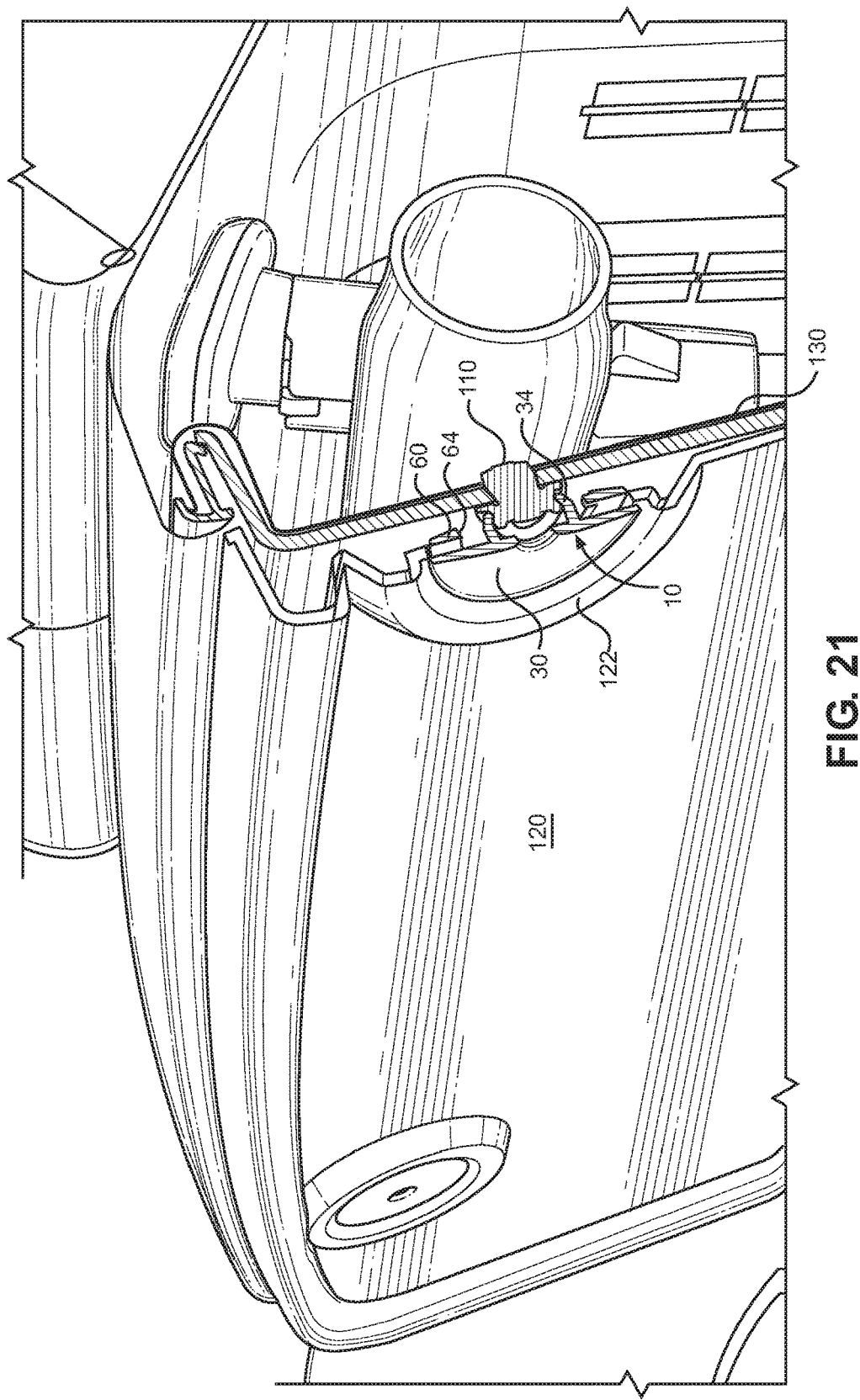
FIG. 21 is a cross-section view of the portion of the liner of FIG. 20 installed in the cargo area of the vehicle with a pair of the fastener assemblies.

FIG. 21 is a cross-section view of the portion of the liner 120 of FIG. 20 installed in the cargo area of the vehicle with a pair of the fastener assemblies 10. As shown in FIG. 21, the cap 30 and the retainer 60 communicate with opposing sides of the liner 120 at the hole 122. Particularly, the cap 30 is inserted from the side of the hole 122 facing the interior of the cargo area while the retainer 60 is inserted from the side of the hole 122 facing the surface of the cargo area covered by the liner 120.

In the present embodiment, orientation of the cap 30 and the retainer 60 as described above facilitates attachment of the liner 120 to a rear panel 130 of a seat assembly facing the interior of the cargo area. The rear panel 130 can have the male fastener 110 extending therefrom at a position aligned with the respective hole 122 in the liner 120 when the liner 120 is brought into contact with the rear panel 130 for installation. The cap 30, particularly the central portion 34, extends through the opening 64 in the retainer 60 and projects towards the rear panel 130. As the liner 120 is pressed toward the rear panel 130, the projecting central portion 34 contacts and engages the male fastener 110. The male fastener 110 engages the central portion 34 of the cap 30 to thereby secure the fastener assembly 10, and thus the liner 120, to the rear panel 130. In this manner, the liner 120 is secured in the cargo area.

Figure 22:
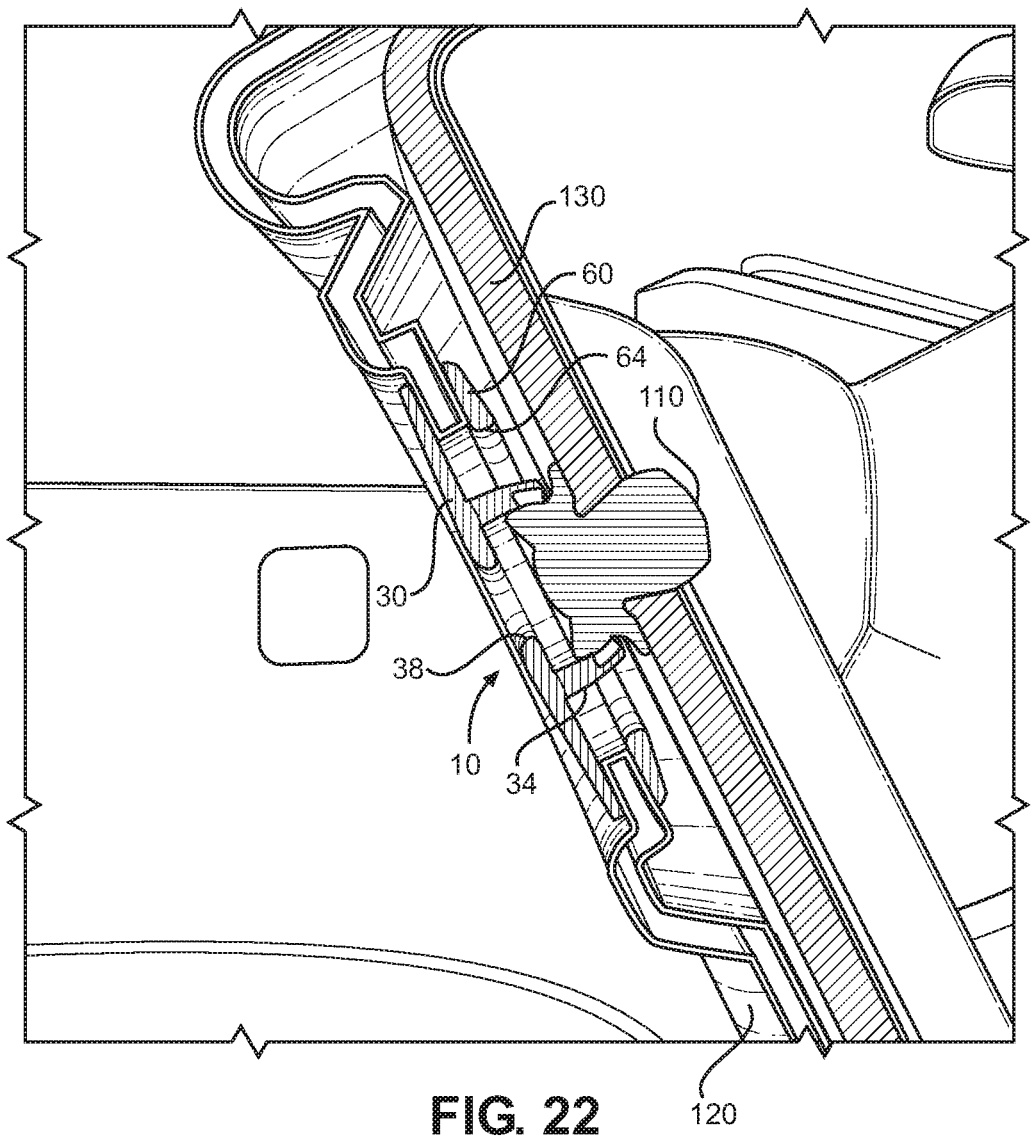
FIG. 22 is an alternate perspective of the cross-section view of the portion of the liner of FIG. 20 installed in the cargo area of the vehicle with a pair of the fastener assemblies.

FIG. 22 is an alternate perspective of the cross-section view of the portion of the liner 120 of FIG. 20 installed in the cargo area of the vehicle with a pair of the fastener assemblies 10. As shown in FIG. 22, a portion of the liner 120 can be secured between the cap 30 and the retainer 60. With the liner 120 secured therein, the fastener assembly 10 can be brought into contact with the male fastener 110 projecting from a surface to be protected by the liner 120 such as the rear panel 130. The rear panel 130 can have the male fastener 110 extending therefrom at a position corresponding to a desired placement position of the corresponding hole 122 of the liner 120. The central portion 34 can thereby be brought into snap engagement with a complementary shaped portion of the male fastener 110 to secure fitment together.

The cap 30 of the present embodiment can also include the hole 38 adjacent the central portion 34. The hole 38 can thus be brought into proximity with a facing surface of the male fastener 110 when the male fastener 110 is engaged with the cap 30. Given this proximity, the hole 38 can provide access to the both the male fastener 110 and the interior surfaces of the central portion 34 from the side of the liner 120 facing the interior of the cargo area. Tools can therefore be inserted through the hole 38 to manipulate the male fastener 110 and the interior surfaces of the central portion 34 to facilitate disengagement of the central portion 34 from the male fastener 110, thereby releasing the fastener assembly 10 and the liner 120 for maintenance/repair and replacement.

Figure 23:
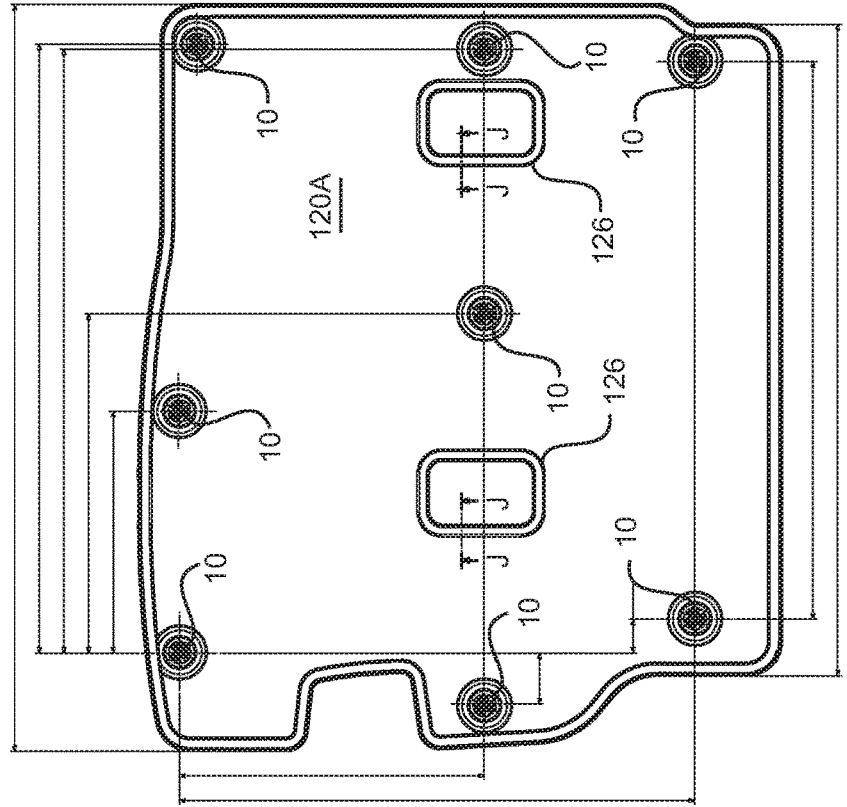
FIG. 23 is a plan view of embodiments of the liners of FIG. 19 in an uninstalled state.

FIG. 23 is a plan view of embodiments of the liners 120A and 120B of FIG. 19 in an uninstalled state. As shown in FIG. 23, embodiments of the liner 120 such as the liners 120A and 120B can have various configurations and numbers of the fastener assemblies 10. The fastener assemblies 10 can be aligned with adjacent fastener assemblies 10 vertically and/or horizontally, or may be irregularly positioned within the liner 120. In embodiments in which the liner 120 has a substantial surface area, the fastener assemblies 10 can be positioned at more interior portions of the liner 120 spaced farther from edges thereof.

Figure 24:
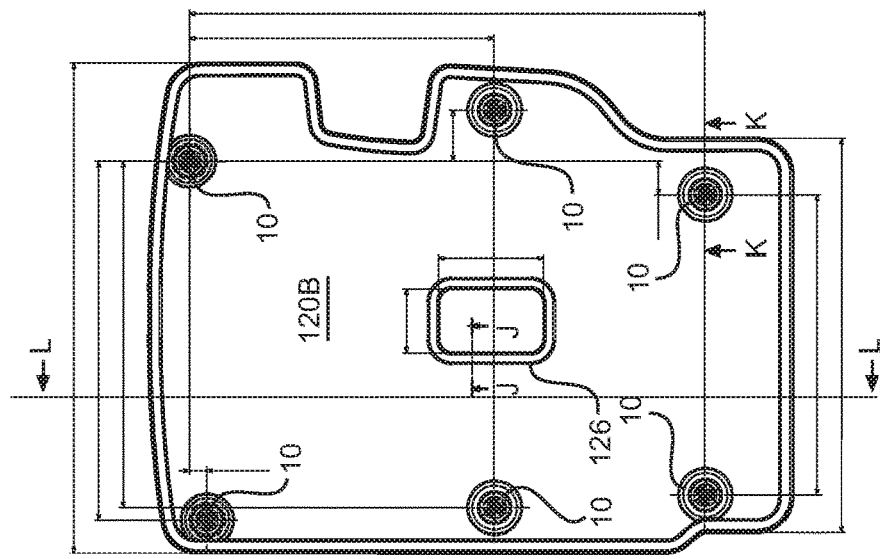
FIG. 24 is a cross-section view of an embodiment of the liner 120 of FIG. 23.

FIG. 24 is a cross-section view L-L of an embodiment of the liner 120 of FIG. 23. As shown in FIG. 24, the liner 120 can have substantially planar surfaces defining the opposing sides thereof.

Figure 25:
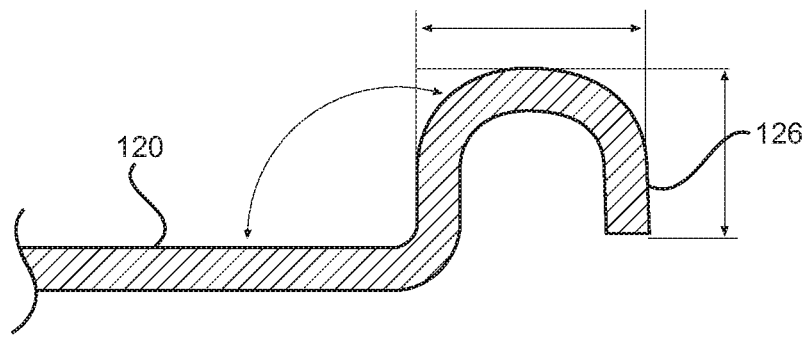
FIG. 25 is a cross-section view J-J of an opening in the liner.

FIG. 25 is a cross-section view J-J of an opening 126 in the liner 120 of FIG. 23. As shown in FIG. 25, embodiments of the liners 120A and 120B can include the openings 126 disposed therein. The openings 126 can provide passage through the liners 120A and 120B from the interior of the cargo area to the protected surfaces, such as of the rear panel 130. Raised walls or lips can surround the openings 126.

Figure 26:
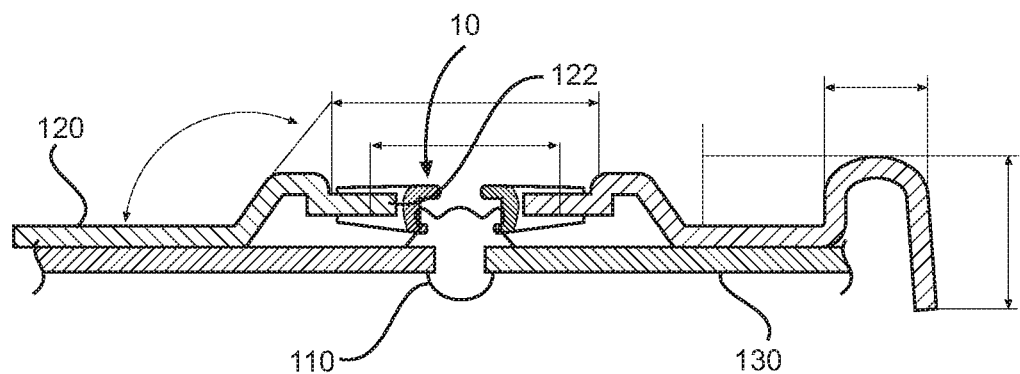
FIG. 26 is a cross-section view K-K of the fastener assembly attached to the liner of FIG. 23.

FIG. 26 is a cross-section view K-K of the fastener assembly 10 attached to the liner 120 of FIG. 23. As shown in FIG. 26, the raised portion surrounding the hole 122 spaces the attached fastener assembly 10 from the rear panel 130 to facilitate fitment of the male fastener 110 with the fastener assembly 10 so that the liner 120 can rest flush against the rear panel 130.

Figure 27:
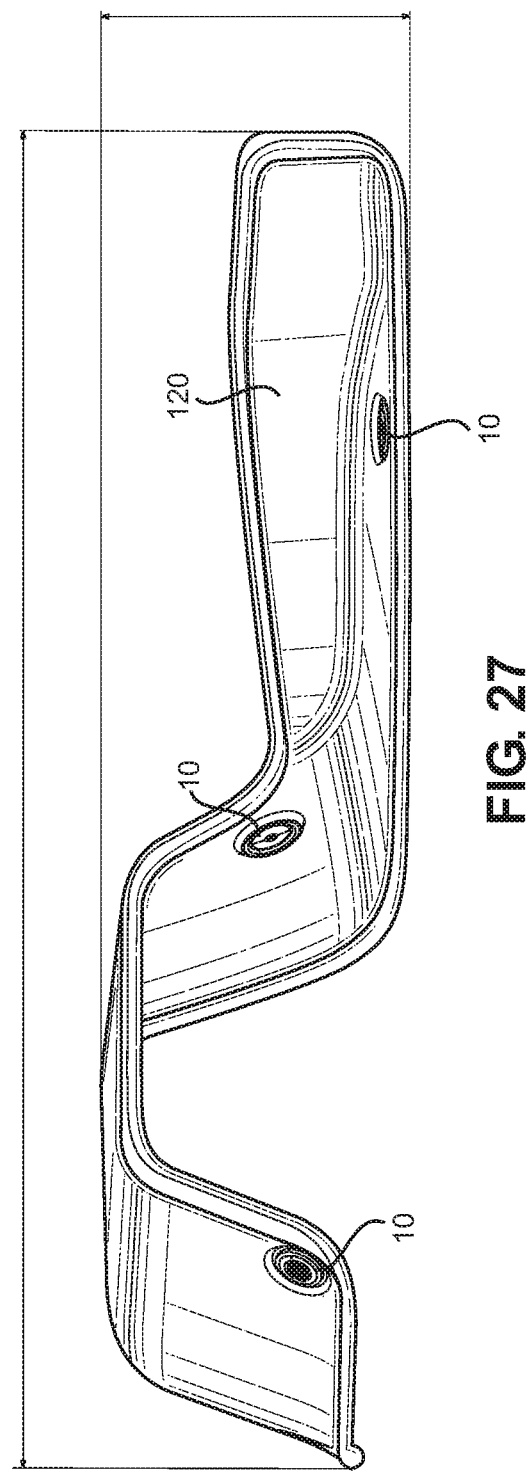
FIG. 27 is a perspective view of an embodiment of the liner with the fastener assemblies attached.

FIG. 27 is a perspective view of an embodiment of the liner 120 with the fastener assemblies 10 attached. As shown in FIG. 27, the liner 120 can curve and contour to follow contours and match shapes of the interior surface of the cargo area, such as the rear panel 130, that the liner 120 is configured to protect. The fastener assemblies 10 can also be disposed on various surfaces of the liner 120 facing different directions.

Figure 28:
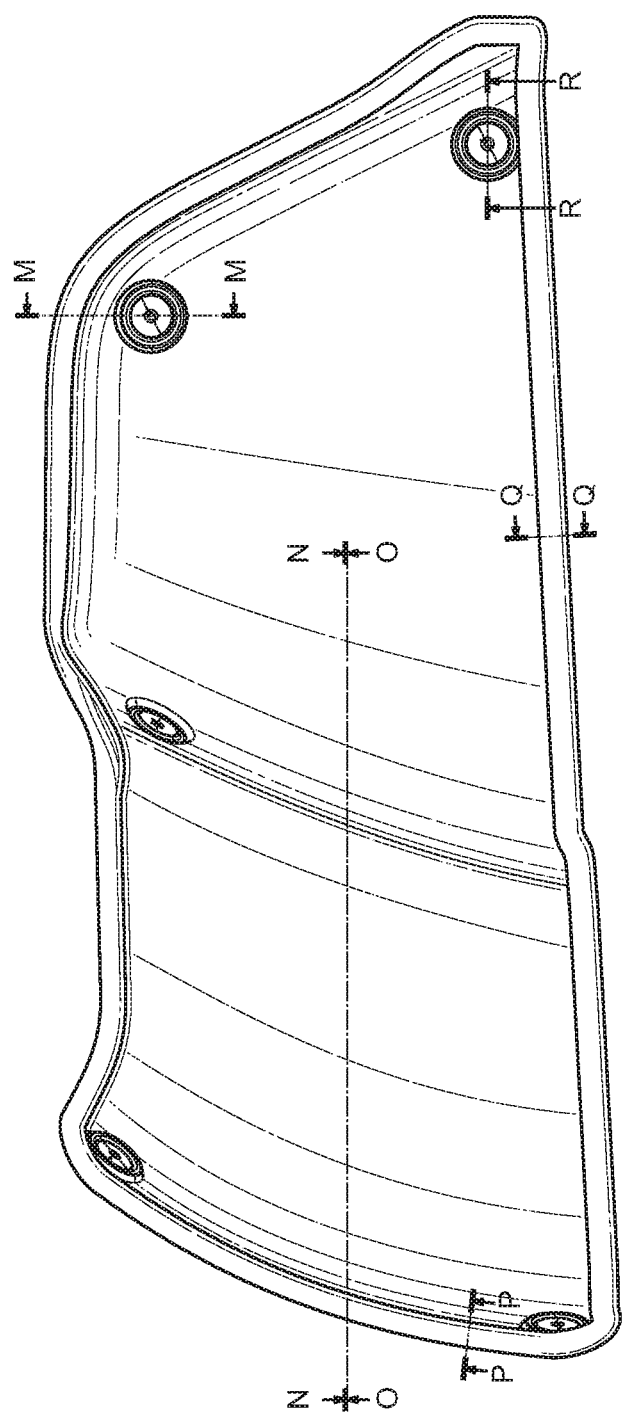
FIG. 28 is an alternate perspective view of an embodiment of the liner with the fastener assemblies attached showing cross-sections M-M, N-N, O-O, P-P, Q-Q and R-R.

FIG. 28 is an alternate perspective view of an embodiment of the liner 120 with the fastener assemblies 10 attached showing cross-sections M-M, N-N, O-O, P-P, Q-Q and R-R.

Figure 29:
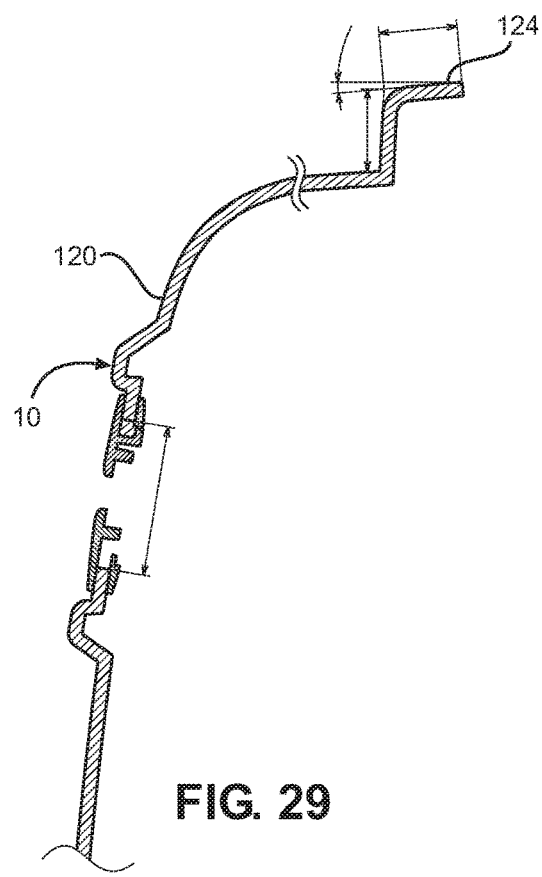
FIG. 29 is a cross-section view M-M of the fastener assembly attached to the liner of FIG. 28.

FIG. 29 is a cross-section view M-M of the fastener assembly 10 attached to the liner 120 of FIG. 28. As shown in FIG. 29, the liner 120 can have a raised ridge along the top liner edge 124.

Figure 30:
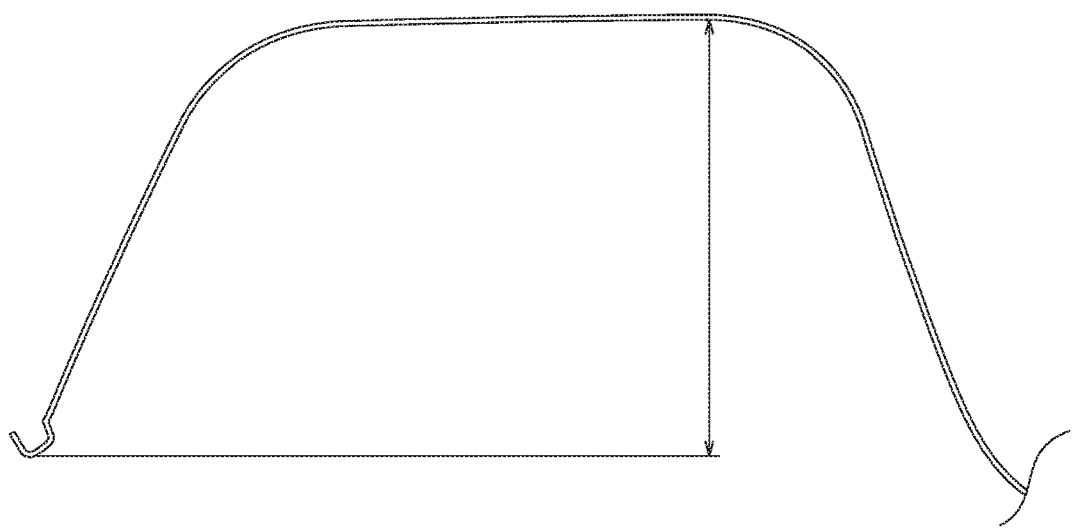
FIG. 30 is a cross-section view N-N of the liner of FIG. 28.

FIG. 30 is a cross-section view N-N of the liner 120 of FIG. 28. As shown in FIG. 30, the liner 120 can be contoured with a substantially concave shape in cross-section.

Figure 31:
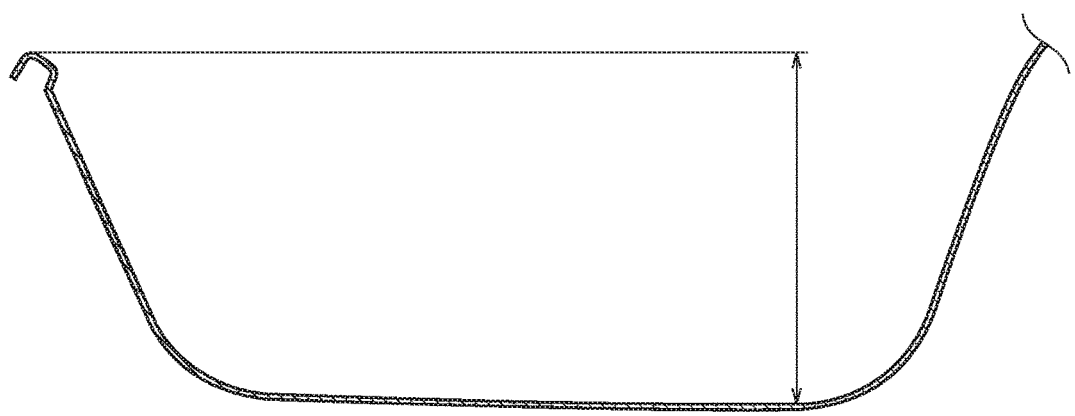
FIG. 31 is an alternate cross-section view O-O of the liner of FIG. 28.

FIG. 31 is an alternate cross-section view O-O of the liner 120 of FIG. 28.

Figure 32:
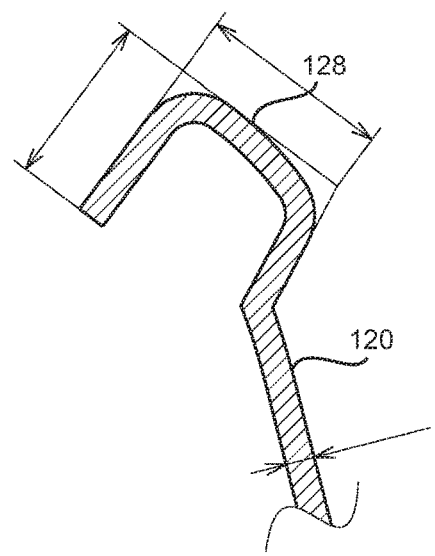
FIG. 32 is a cross-section view P-P of the liner of FIG. 28.

FIG. 32 is a cross-section view P-P of the liner 120 of FIG. 28. As shown in FIG. 32, the liner 120 can include a side liner edge 128 with a ridge.

Figure 33:
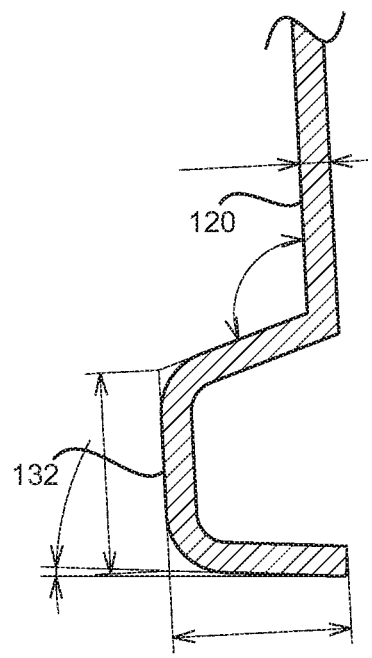
FIG. 33 is a cross-section view Q-Q of the liner of FIG. 28.

FIG. 33 is a cross-section view Q-Q of the liner 120 of FIG. 28. As shown in FIG. 33, the liner 120 can include a bottom liner edge 132 with a ridge.

Figure 34:
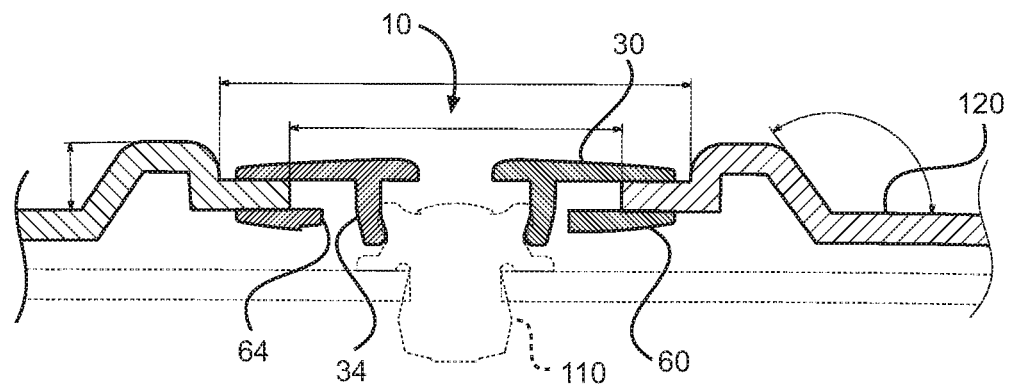
FIG. 34 is a cross-section view R-R of the fastener assembly attached to the liner of FIG. 28.

FIG. 34 is a cross-section view R-R of the fastener assembly 10 attached to the liner 120 of FIG. 28. As shown in FIG. 34, the liner 120 is clamped between the cap 30 and the retainer 60, with the central portion 34 extending through the opening 64 to engage the male fastener 110 for securing the liner 120 to the surface of the cargo area.

VI. Alternative Embodiments

While certain embodiments of the invention are described above, and FIGS. 1-34 disclose the best mode for practicing the various inventive aspects, it should be understood that the invention can be embodied and configured in many different ways without departing from the spirit and scope of the invention.

For example, embodiments are disclosed above in the context of a fastener apparatus for securing a cargo liner in a cargo area of a vehicle, as shown in FIGS. 1-34. However, embodiments are intended to include or otherwise cover any type of fastener assembly disclosed above. For example, embodiments of the fastener assembly disclosed above can be configured to secure liners to any interior surfaces of the vehicle besides the cargo area, such as passenger areas. In another alternate embodiment, the fastener assembly can also be configured to attach structural components to each other when it is desirable that the attachment be nonpermanent and parts removable for repair/maintenance and replacement. However, the above alternative embodiments are merely provided for exemplary purposes, and as indicated above, embodiments are intended to cover any type of fastener assembly disclosed above.

Embodiments are also intended to include or otherwise cover methods of using and methods of manufacturing the fastener assembly disclosed above. The methods of manufacturing include or otherwise cover processors and computer programs implemented by processors used to design various elements of the fastener assembly disclosed above. For example, embodiments are intended to cover processors and computer programs used to design or manufacture the parts of the fastener assembly such as the cap and retainer.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A fastener assembly for attaching a cargo liner to a male fastener of a vehicle, the fastener assembly comprising:
    a cap defining a cylindrical center portion configured to receive the male fastener therein, and a plurality of tabs each spaced from the cylindrical center portion; and
    a ring-shaped retainer defining an opening with a plurality of protrusions that each define a ledge configured to receive a corresponding one of the tabs.

2. The fastener assembly of claim 1, wherein the tabs are disposed concentrically around the cylindrical center portion and spaced apart from each other.

3. The fastener assembly of claim 1, wherein the ledge of each of the protrusions includes a stop on an end thereof.

4. The fastener assembly of claim 3, wherein a surface of the ledge of each of the protrusions is tapered on another end thereof.

5. The fastener assembly of claim 4, wherein the surface of the ledge of each of the protrusions includes a recessed portion adjacent the tapered end of the ledge.

6. The fastener assembly of claim 4, wherein a surface of each of the tabs is tapered for engagement with the surface of the ledge of the corresponding each of the protrusions.

7. The fastener assembly of claim 1, wherein the cap includes a circular disc-shaped body.

8. The fastener assembly of claim 7, wherein the cylindrical center portion and each of the tabs protrude in a same direction from the circular disc-shaped body.

9. The fastener assembly of claim 8, wherein each of the tabs protrudes from the circular disc-shaped body a distance of at least a thickness of the ring-shaped retainer.

10. The fastener assembly of claim 1, wherein each of the protrusions are spaced from adjacent protrusions around the opening of the ring-shaped retainer by a distance of at least a length of each of the tabs.

11. A cargo liner assembly for attachment to a cargo area of a vehicle comprising:
    a liner body having at least one aperture extending from a first side of the liner body through to a second side of the liner body; and
    the fastener assembly of claim 1, wherein
    the cap being configured for engagement with the at least one aperture on the first side of the liner body, and
    the ring-shaped retainer being configured for engagement with the at least one aperture on the second side of the liner body.

12. The fastener assembly of claim 11, wherein the ledge of each of the protrusions includes a stop on an end thereof.

13. The fastener assembly of claim 12, wherein a surface of the ledge of each of the protrusions is tapered on another end thereof.

14. The fastener assembly of claim 13, wherein the surface of the ledge of each of the protrusions includes a recessed portion adjacent the tapered end of the ledge.

15. The fastener assembly of claim 13, wherein a surface of each of the tabs is tapered for engagement with the surface of the ledge of the corresponding each of the protrusions.

16. The fastener assembly of claim 11, wherein the cap includes a circular disc-shaped body.

17. The fastener assembly of claim 16, wherein the cylindrical center portion and each of the tabs protrude in a same direction from the circular disc-shaped body.

18. The fastener assembly of claim 17, wherein each of the tabs protrudes from the circular disc-shaped body a distance of at least a thickness of the ring-shaped retainer.

19. The fastener assembly of claim 11, wherein each of the protrusions are spaced from adjacent protrusions around the opening of the ring-shaped retainer by a distance of at least a length of each of the tabs.

20. A fastener assembly for attaching a cargo liner to a vehicle comprising:
    a female fastener including:
        a cap defining a cylindrical center portion and a plurality of tabs each spaced from the center portion; and
        a ring-shaped retainer defining an opening with a plurality of protrusions that each define a ledge configured to receive a corresponding one of the tabs; and
    a male fastener defining a cylindrical center portion configured to be inserted into the cylindrical center portion of the cap.

* * * * *